United States Patent
Tu et al.

(10) Patent No.: US 11,373,069 B2
(45) Date of Patent: Jun. 28, 2022

(54) ANALOGY ENGINE FOR GROUNDING AND SITUATIONAL AWARENESS

(71) Applicant: General Electric Company, Schenectady, NY (US)

(72) Inventors: Peter Henry Tu, Niskayuna, NY (US); Tao Gao, Los Angeles, CA (US); Alexander S-Ban Chen, Cypress, CA (US); Jilin Tu, Campbell, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 173 days.

(21) Appl. No.: 16/824,917

(22) Filed: Mar. 20, 2020

(65) Prior Publication Data
US 2021/0295102 A1    Sep. 23, 2021

(51) Int. Cl.
G06K 9/62 (2022.01)
G06F 16/55 (2019.01)
G06N 3/08 (2006.01)
G06V 40/16 (2022.01)

(52) U.S. Cl.
CPC ........... *G06K 9/6293* (2013.01); *G06F 16/55* (2019.01); *G06K 9/628* (2013.01); *G06K 9/6232* (2013.01); *G06K 9/6257* (2013.01); *G06N 3/08* (2013.01); *G06V 40/165* (2022.01)

(58) Field of Classification Search
CPC ..... G06K 9/6217–6265; G06K 9/6293; G06K 9/00248; G06K 9/6232; G06K 9/6257; G06K 9/628; G06F 16/55; G06N 3/08; G06V 40/165
See application file for complete search history.

(56) References Cited

U.S. PATENT DOCUMENTS

| | | |
|---|---|---|
| 6,523,026 B1 | 2/2003 | Gillis |
| 9,158,847 B1 | 10/2015 | Majumdar |
| 9,251,421 B2 | 2/2016 | Tu et al. |

(Continued)

FOREIGN PATENT DOCUMENTS

CN        107491434 A        12/2017

OTHER PUBLICATIONS

Mathieu et al, "Disentangling factors of variation in deep representations using adversarial training" (published in 30th Conference on Neural Information Processing Systems, pp. 5047-5055, Dec. 2016) (Year: 2016).*

(Continued)

*Primary Examiner* — Casey L Kretzer
(74) *Attorney, Agent, or Firm* — Fletcher Yoder P.C.

(57) ABSTRACT

An analogy generating system includes one or more image databases that include a first set of images depicting a first symbolic class and a second set of images depicting a second symbolic class and an autoencoder that receive images from the first set of images and the second set of images; determines a first characteristic shared between the first symbolic class and the second symbolic class using a first node from multiple nodes on a neural network; determine a second characteristic shared between the first symbolic class and the second symbolic class using a second node from multiple nodes on the neural network; and exchange the first characteristic and the second characteristic between the first node and the second node to establish an analogy between the first symbolic class and the second symbolic class.

16 Claims, 4 Drawing Sheets

(56) References Cited

U.S. PATENT DOCUMENTS

| | | | |
|---|---|---|---|
| 9,892,112 | B1 | 2/2018 | Allen et al. |
| 9,946,934 | B2 | 4/2018 | Eaton et al. |
| 2013/0173504 | A1 | 7/2013 | Tu et al. |
| 2017/0213132 | A1 | 7/2017 | Hammond et al. |
| 2017/0344860 | A1* | 11/2017 | Sachs ........................ G06T 7/73 |
| 2018/0189634 | A1 | 7/2018 | Abdelaziz et al. |

OTHER PUBLICATIONS

Deacon, Terrence W., et al.; "Symbolic Species: The Co-evolution of Language and the Brain", 1997, 531 pages.

Hofstadter, Douglas, et al.; "Surfaces and Essences: Analogy as the Fuel and Fire of Thinking", Researchgate, 2013, 1 page.

Pathak, Deepak, et al.; "Context Encoders: Feature Learning by Inpainting", 2016 IEEE Conference on Computer Vision and Pattern Recognition (CVPR), pp. 2536-2544, Las Vegas, 2016, pp. 1-9.

Reed, Scott, et al.; "Deep Visual Analogy-Making", Jan. 1, 2015 (Jan. 1, 2015), XP055298141, Retrieved from the Internet: URL: http://web.eecs.umich.edu/~honglak/nips2015-analogy.pdf, pp. 1-9.

Jetchev, Nikolay, et al.; "The Conditional Analogy GAN: Swapping Fashion Articles on People Images", 2017 IEEE International Conference on Computer Vision Workshops (ICCVW), IEEE, Oct. 22, 2017 (Oct. 22, 2017), pp. 2287-2292, XP033303695, DOI: 10.1109/ICCVW.2017.269.

Hill, Felix, et al.; "Learning to Make Analogies by Contrasting Abstract Relational Structure", arxiv.org Cornell University Library, 201 Olin Library Cornell University Ithaca, NY 14853, Feb. 1, 2019 (Feb. 1, 2019), XP081024017, pp. 1-18.

Lu, Hongjing, et al.; "Seeing the Meaning: Vision Meets Semantics in Solving Pictorial Analogy Problems", Proceedings of the 41 St Annual Meeting of the Cognitive Science Society, Jan. 1, 2019 (Jan. 1, 2019), pp. 1-7, XP055813441, Retrieved from the Internet: URL: https://par.nsf.gov/servlets/purl/10093529.

International Search Report and Written Opinion for PCT Application No. PCT/US2021/023009 dated Jun. 23, 2021 (13 pages).

* cited by examiner

ANALOGY ENGINE FOR GROUNDING AND SITUATIONAL AWARENESS

BACKGROUND

The field of the disclosure relates generally to a visually-driven analogy generating system and, more particularly, to an analogy generating system for symbolic classes used to process image or video data.

Neural networks may be trained to learn how to identify certain characteristics of an image, such as identifying eyes on a human face or a tail on a dog. Certain neural networks, such as autoencoders, may be used to or trained to establish relationships between certain groups of images and use such relationships to bridge (i.e., "fill in") missing parts of an image. While these neural networks may be effective at determining characteristics in incomplete or ambiguous images depicting contexts for which they have been trained, they typically do so without establishing clear concepts as to the missing subject matter or related features. As a result, such approaches are typically not readily extendable to images or representations depicting other objects or contexts.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a general embodiment, two or more image classes are used to train an autoencoder by sharing middle nodes on a neural network. Adjustments to one of the middle nodes causes changes in two images from two different classes. The changes in the images may determine a common characteristic between the two images that forms the basis for an analogy between two images.

In a first embodiment, an analogy generating system includes one or more image databases that include a first set of images depicting a first symbolic class and a second set of images depicting a second symbolic class and an autoencoder that receive images from the first set of images and the second set of images; determines a first characteristic shared between the first symbolic class and the second symbolic class using a first node from multiple nodes on a neural network; determine a second characteristic shared between the first symbolic class and the second symbolic class using a second node from multiple nodes on the neural network; and exchange the first characteristic and the second characteristic between the first node and the second node to establish an analogy between the first symbolic class and the second symbolic class.

In a second embodiment, a method involves receiving a first set of images from a first image data base and a second set of images from a second image data base, where the first set of images depicts a first symbolic class and the second set of images depicts a second symbolic class; determining a first characteristic shared between the first symbolic class and the second symbolic class using a first node from a plurality of nodes on a neural network; determining a second characteristic shared between the first symbolic class and the second symbolic class using a second node from the plurality of nodes on the neural network; and exchanging the first characteristic and the second characteristic between the first node and the second node to establish an analogy between the first symbolic class and the second symbolic class.

In a third embodiment, a non-transitory computer readable medium stores instructions that, when executed by a processor, cause the processor to: receive a first set of images and a second set of images, where the first set of images depicts a first symbolic class and the second set of images depicts a second symbolic class; determine a first characteristic shared between the first symbolic class and the second symbolic class using a first node from a plurality of nodes on a neural network; determine a second characteristic shared between the first symbolic class and the second symbolic class using a second node from the plurality of nodes on the neural network; and exchange the first characteristic and the second characteristic between the first node and the second node to establish an analogy.

DRAWINGS

These and other features, aspects, and advantages of the present disclosure will become better understood when the following detailed description is read with reference to the accompanying drawings in which like characters represent like parts throughout the drawings, wherein.

Figure 1:
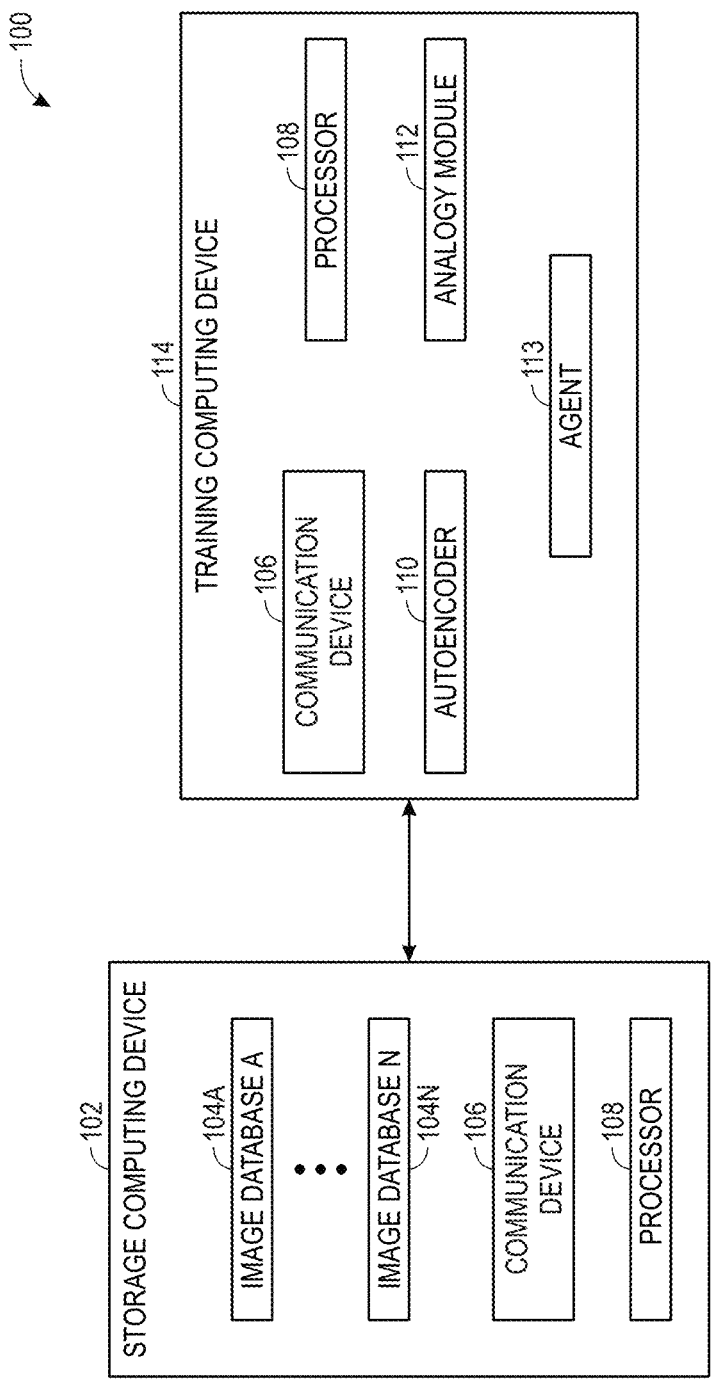
FIG. 1 depicts a system block diagram illustrating aspects of an analogy generating system, in accordance with aspects of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. The terms "optional" or "optionally" mean that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In general, the present disclosure relates to an analogy generating system that determines relationships between symbolic classes using a neural network and representative images (or other data or visual representations) of the symbolic classes. In particular, the analogy generating system may use an autoencoder neural network to determine similar characteristics between different symbolic classes for which one or more "analogies" may be inferred by using a pair of images from a first symbolic class and a second symbolic class as an input layer. As used herein, an "analogy" may be understood to be an inferable trait or characteristic that may be identified between two otherwise dissimilar types of objects or actions. By way of example, objects of the classes "table" and "chair" may be analogized based on representative objects of each class having four legs or, alternatively, as being furniture, and so forth. Objects of the class "chair" may be further analogized to objects of the type "bench" as objects on which people sit while benches may not be analogized to "table" for such a relationship (but still might be analogized to "tables" as types of furniture). As used herein, an analogy generating system may determine such relational concepts to the individual symbolic classes by using the analogies between the symbolic classes. From this information, the analogy generating system may determine or infer unknown (i.e., previously unlearned or untrained) concepts by using the analogies between known concepts.

With the preceding context in mind, FIG. 1 is a block diagram for an analogy generating system 100 as discussed herein. The analogy generating system 100 may include a storage computing device 102 and a training computing device 114. While the analogy generating system 100 shows each of these components as separate computing devices that are communicatively linked to each other, it should be understood that the functionality of the storage computing device 102 and the training computing device 114 may be provided in the same computing device in certain implementations. Additionally, the analogy generating system 100 may be communicatively coupled to a variety of data sources that may assist the analogy generating system 100 in performing the functions of the embodiments described herein. Each of these components are described below.

The analogy generating system 100 may include a storage computing device 102. The storage computing device may be any suitable computing device, such as a general- or special-purpose personal computer, a laptop computer, a tablet computer, a mobile computer, a server, and the like that is configured in accordance with present embodiments. The storage computing device 102 may include various types of components that may assist the storage computing device 102 in performing various types of computer tasks and operations. For example, the storage computing device 102 may include a processor 108, one or more image databases 104A through 104N, and a communication device 106. In addition, the storage computing device 102 may also include a memory, a display, input/output (I/O) ports, and the like.

The processor 108 may be any type of computer processor or microprocessor capable of executing computer-executable code. The processor 108 may also include multiple processors that may perform the operations described below. In one or more embodiments, the processor 108 may be a graphics processor.

The image databases 104A through 104N may be any suitable articles of manufacture or digital or virtual constructs that can serve as media or platforms to store files, data, or the like. Such databases may include or be based on computer-readable media (e.g., any suitable form of memory or storage) that may store the data and files used by the storage computing device 102 to perform the presently disclosed techniques. It should be noted that non-transitory merely indicates that the media is tangible and not a signal. In one or more embodiments, the image databases 104 may include or incorporate any type of storage device such as a memory device, databanks, a server, a hard drive, a flash drive, or any other type of storage device capable of storing files.

In one or more embodiments, the image databases 104 store a collection of images of different symbolic classes. The symbolic classes may each represent an image of a different set of objects, actions, behaviors, social cues, etc. For example, one symbolic class may be images of dogs that focus on the facial features of a dog, and another symbolic class may be images of humans that focus on the facial features of a human. In another example, a symbolic class may be images of people walking, people picking up an object, cars driving, and various other actions by animals, humans, or objects. The images may be uploaded to the image databases 104 from a personal camera, personal database, or any other type of media that may transfer images and data from one computing device to another. In one or more embodiments, the images may be downloaded onto the image databases 104 from an external source to produce an expansive data set.

The image databases 104 may be a collection of databases with each database storing a different set of images. The image databases 104 may be allocated in such a manner that different databases or tables within the databases focus on a particular symbolic class. Alternatively, images associated with different symbolic classes may be stored in the same database or table, with a respective symbolic class field associated with a given symbolic class record offering a queryable mechanism to access or identify image files associated with different symbolic class. For example, there may be three databases with one database assigned to store images of cats, one database assigned to store images of dogs, and one database assigned to store images of humans. In another example, there may be three databases with one data base assigned to humans walking, one data base assigned to humans jumping, and one database assigned to humans swimming. The number of databases and/or tables assigned within a database may vary, and in one or more embodiments, a single database may be used to store all of the images of facial expressions.

In one or more embodiments, the storage computing device 102 may include a communication device 106. The communication device 106 may be a wireless or wired communication component that may facilitate communication between the storage computing device 102, database, and various other computing systems via a network, the Internet, or the like. For example, the communication device 106 may be an Ethernet cable and/or network interface card (NIC) connected to the storage computing device 102 that allows the storage computing device to access internet network to transfer a file.

Turning back to the expression classification system 100, a training computing device 114 may be any type of computing device capable of or configured to perform deep learning training. The training computing device 114 may be any suitable computing device, such as a general- or special-purpose personal computer, a laptop computer, a tablet computer, a mobile computer, a server, and the like that is configured in accordance with present embodiments. The training computing device 114 may include various types of components that may assist the training computing device 114 in performing various types of computer tasks and operations. For example, the training computing device 114 may include a processor 108, one or more databases, and a communication device 106. In addition, the training computing device 114 may also include a memory, a display, input/output (I/O) ports, and the like.

The training computing device 114 may include or otherwise implement an autoencoder 110. The autoencoder 110 may be any suitably programmed and/or configured executable computer code, program, routine, neural network (or other deep learning model), or application. Additionally, the autoencoder 110 may be supervised, semi-supervised, or unsupervised in terms of learning behavior context. In other words, the autoencoder 110 may operate with user interaction or without user interaction.

Figure 2:
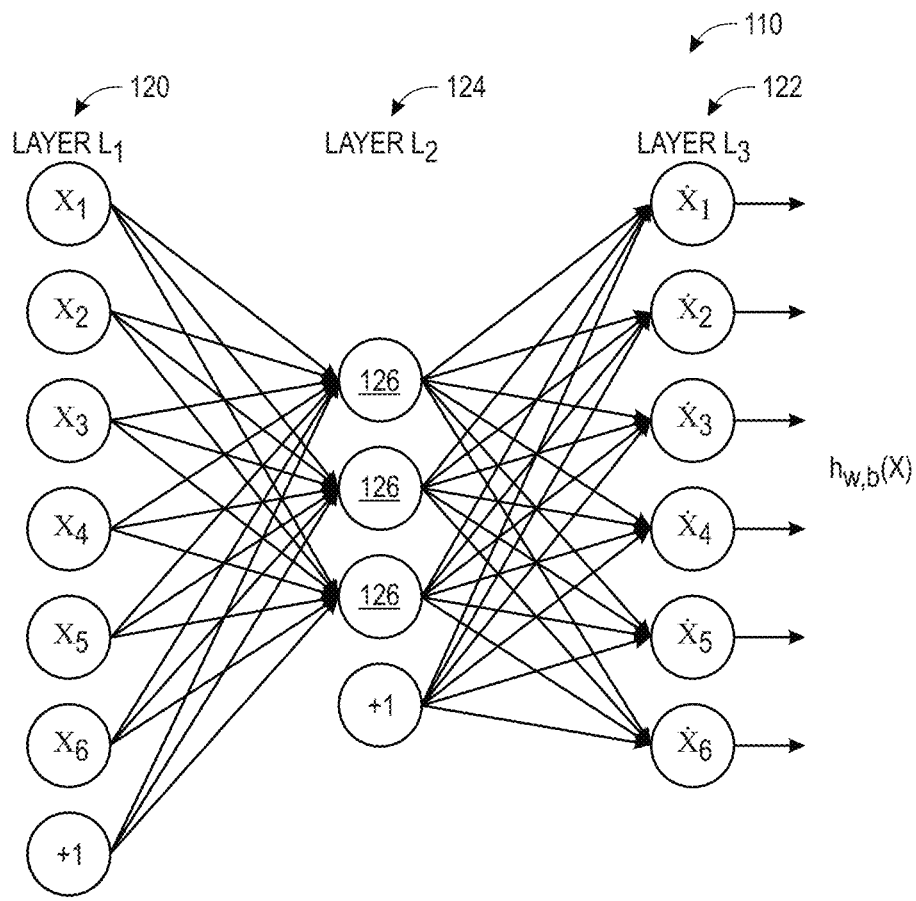
FIG. 2 shows an example of an autoencoder, in accordance with aspects of the present disclosure.

By way of visual representation as to how such a autoencoder 110 may work in a generalized sense, FIG. 2 depicts a graphical representation corresponding to the processing of a symbolic classifier or multiple symbolic classifiers 120 (e.g., $x_1, x_2, x_3, x_4, x_5, x_6$) through the autoencoder 110 (i.e., neural network) to generate one or more analogies 122 (e.g., $\dot{x}_1, \dot{x}_2, \dot{x}_3, \dot{x}_4, \dot{x}_5, \dot{x}_6$) as an output, i.e., one or more symbolic classifiers 120 yields one or more analogies 124 as an output when run through the autoencoder 110. In one or more embodiments, the autoencoder 110 receives two separate symbolic classes 120 as input.

In one more embodiments, the autoencoder 110 may receive images of the symbolic classifiers 120 from the image databases 104 to an input layer. The images may be used to assist in training the autoencoder 110. The autoencoder 110 may have a middle layer 124 with multiple nodes 126 that receive the images of the symbolic classifiers 120 from the input layer. The middle layer 124 may have a limited number of nodes so as to operate as a "bottleneck" or limiting layer to force the autoencoder 110 to reconstruct the input from a compressed symbolic class 120 in such a way that the symbolic class from the input may be reproduced in output. The middle layer 124 may include multiple nodes that may each track and identify a specific characteristic from each image of the symbolic class 120 from the input. For example, one node may track and identify eyes in each image and another node may track and identify mouths in an image. The nodes 126 may share information and data collected between each other to develop relationships between symbolic classes 120. For example, a node 126 that identify features of a human face, such as an eye, may send information to a second node 126 that identifies features of a dog face. In one or more embodiments, a single node may identify a single characteristic of a symbolic class and share the characteristic with other nodes.

By using multiple symbolic classes 120 (i.e., a pair of symbolic classes) to train the autoencoder 110, the symbolic classes 120 are forced to share nodes 126. In this way, analogies between the symbolic classes 120 may be constructed based on mappings established through shared nodes 126. For example, the autoencoder 110 may be trained with symbolic classes 120 of human facial images and images of a house. The eyes from the human facial images and windows from the house images may share a common node, as might mouths and doors. Information associated with doors and windows acquired by the nodes 126 may then be transferred via analogy by to human faces adding to the meaning of a face.

In one or more embodiments, the autoencoder 110 is initially trained through the labeled images of symbolic classifiers 120 to establish a baseline of symbolic classifiers and analogies 122. For example, the autoencoder 110 may receive a pre-labeled image of a dog and to begin making the connection and learning the symbolic classifier for dog. At another stage in the training, the images may no longer be labeled and the autoencoder 110 makes a determination of the symbolic classifier 120 based on the previous learning.

The training computer device 114 may also include an analogy module 112. The analogy module 112 may be configured or programmed based on the training from the autoencoder 110. In one or more embodiments, the analogy module 112 may determine analogies between multiple symbolic classes 120 without relying on any user interaction. An analogy may be represented as a concept, idea, or recognition between two separate objects and the relationship between the two objects. The analogy module 112 may define 3 elements prior to determining a specific analogy. First, the analogy module 112 may define the past and present symbolic classifiers 120 (i.e., state space) that have been observed directly by the autoencoder 110. The analogy module 112 may define a saliency distribution over all possible analogies (i.e., action space). The autoencoder 110 may be used to approximate optimal mappings of complex state spaces to complex action spaces through a reinforced learning framework. As such, once a saliency distribution has been constructed, sampling methods may be used to select specific analogies. An agent 113 may be utilized in conjunction with the autoencoder 110 to define a reward on whether the proposed analogies guide the autoencoder 110 to take actions that result in a desired measurable outcome. In one or more embodiments, the agent 113 may be a reinforcement learning routine or machine learning algorithm that "rewards" (i.e., an action is carried out to reinforce a desired output) useful analogies. The agent 113 may sort through some or all of the proposed analogies to determine which analogies are useful and which analogies are not useful. For example, the agent 113 may determine that an analogy between a house window and an eye on a face is useful, but an analogy between a house door and a table leg is not useful. The agent 113 may discard the analogies that are determined to not be useful. In one or more embodiments, the analogy module 112 may develop a concept for a symbolic class 120. The concept my represent the characteristics, ideas, patterns, or any other feature of a symbolic class. For example, the concept may be what a human face looks like, what the act of walking or eating looks like, what a happy or angry mood looks like, what a liquid looks like, and so forth. The concept my further include other actions and characteristics associated with an action. For example, the concept of eating may be associated with food or utensils.

Figure 3:
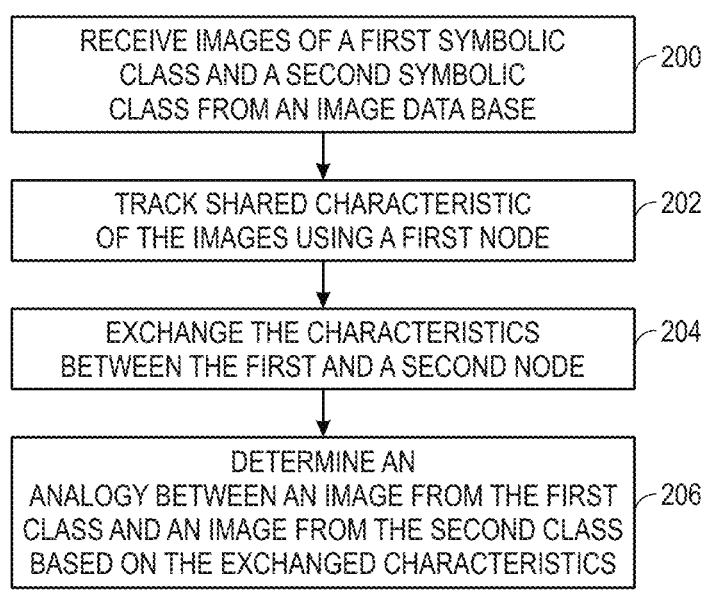
FIG. 3 shows a flow chart for generating an analogy, in accordance with aspects of the present disclosure.

Turning now to FIG. 3, steps for training the autoencoder are shown in accordance with one possible implementation. In step 200, the autoencoder receives an image representing a first symbolic class and an image representing a second symbolic class from one or more image data bases. The image representing the first symbolic class and the image representing the second symbolic class may simultaneously be used by the autoencoder on a similar set of nodes for training.

In step 202, the autoencoder tracks a shared characteristic of the images using a first node. The characteristic of the images may be a similar feature found on the images, such as an eye, mouth, etc. The first node may be assigned to track the characteristic on the images regardless of what the image represents. For example, the first node may track left eyes on an image and track left eyes for humans, animals, or objects that may have the representation of a left eye such as a house with windows.

In step 204, the first node shares the characteristics of the images with a second node. In one or more embodiments, the first node may share the characteristics with multiple nodes. By sharing characteristics of the images between the nodes, the same semantics may be applied to images regardless of the symbolic class. The analogy may be a recognition of similarities between two symbolic classes or a concept shared between two symbolic classes. Analogies between multiple images may be used to determine properties of a new image.

In step 206, an analogy is developed between an image from the first symbolic class and an image from the second symbolic class based on the shared characteristic. The analogy may be constructed based on the mappings of the characteristics shared between the nodes. The analogy may be further lead to the idea of a concept for a symbolic class and associate the concept of the first symbolic class to the second symbolic class.

Figure 4:
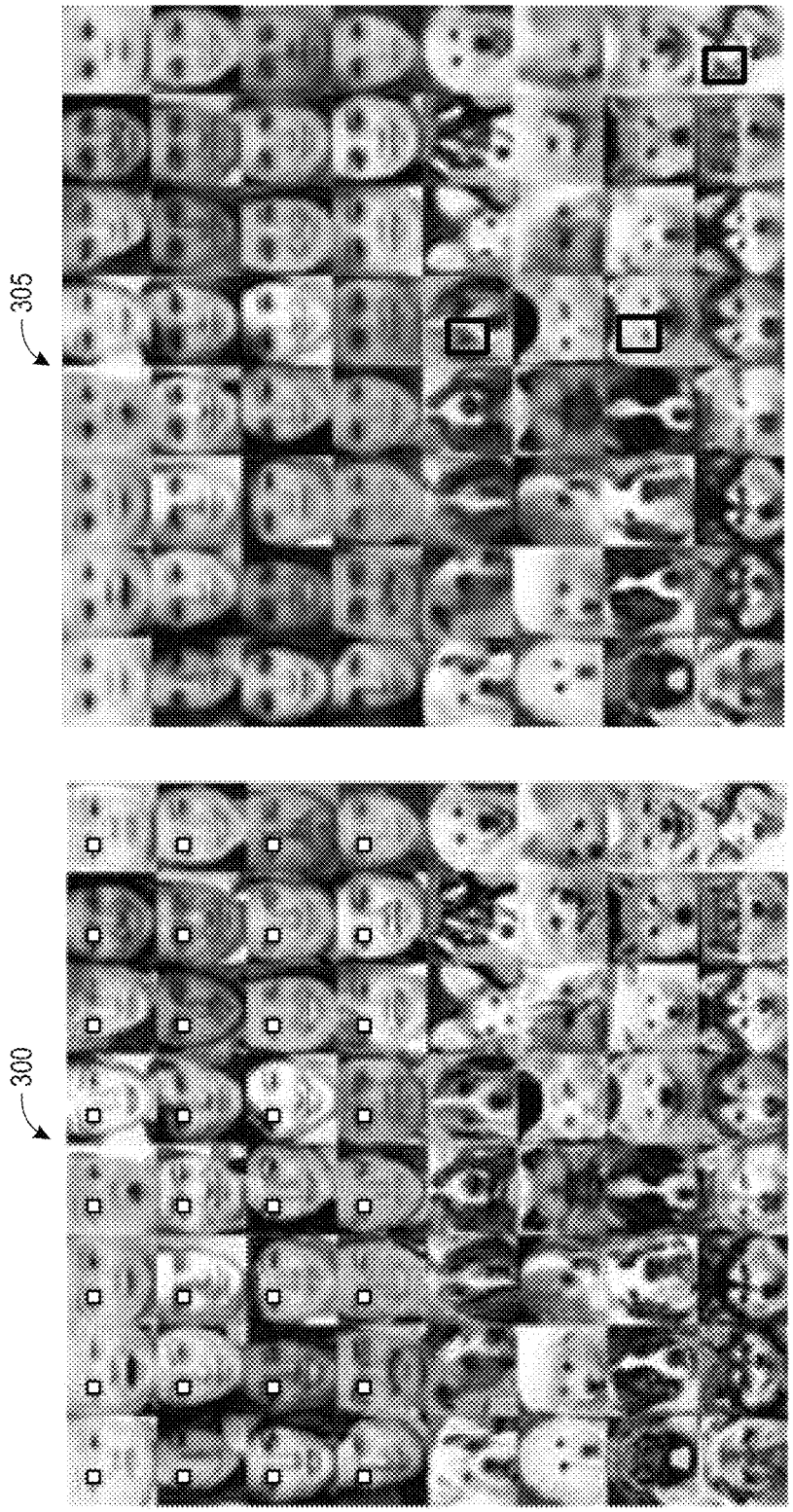
FIG. 4 shows an example of an analogy derived from the analogy generating system, in accordance with aspects of the present disclosure.

FIG. 4 shows an example of using an analogy between two symbolic classes to fill in a missing part of an image. In the first image 300, multiple faces of humans and pets are shown. The humans range from babies to adults and the pets are a mixture of dogs and cats. The first image 300 shows humans with a missing left eye in all the faces of the humans, while the pets have both eyes shown. A pair of an image of a human face and an image of a pet face are sent to the autoencoder until all images have been processed by the autoencoder. The autoencoder is forced to determine similar characteristics of the pet faces and the human faces, one of which are the eyes. By determining that both the pet faces and human faces have right eyes and pet faces have a left eye, as well as other similar characteristics such as mouths and noses, the autoencoder determines that the human face should similarly have a left eye. As such, the autoencoder generates a left eye in the second image 305 for the human faces missing a left eye.

Figure 5:
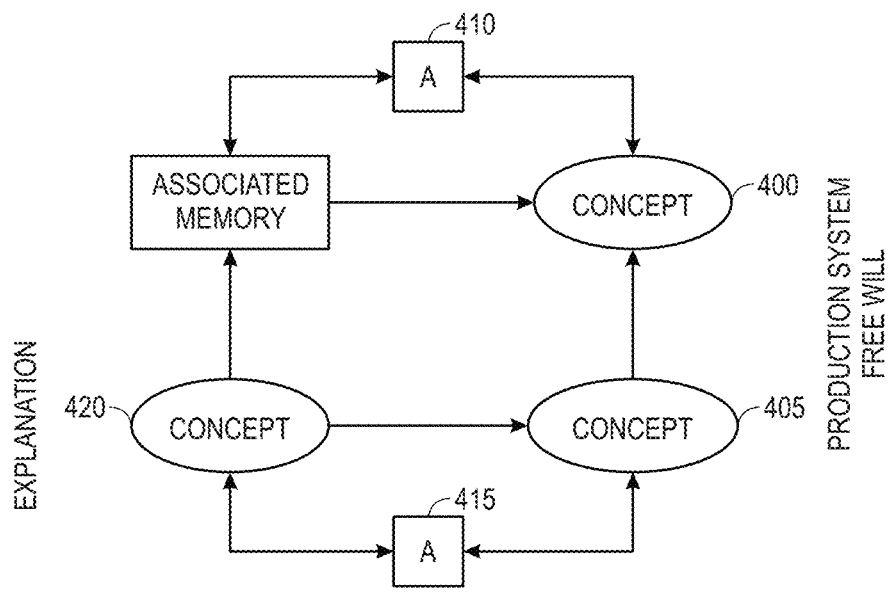
FIG. 5 shows an example of a chain of concepts, in accordance with aspects of the present disclosure.

FIG. 5 shows an example of how analogies may be used to determine a concept. In this example, a first concept 400 and a second concept 405 have been determined and established by the agent. Both concepts have analogies 410 and 415 associated with the concepts that are linked to a third concept 420. However, the agent has not determined the third concept 420. The agent may establish a chain of concepts to determine the third concept 420 from the first concept 400 and the second concept 405. The agent may use the first analogy 410 established between the first concept 400 and the third concept 420 and the second analogy 415 established between the second concept 405 and the third concept 420 to determine the third concept 420.

Figure 6:
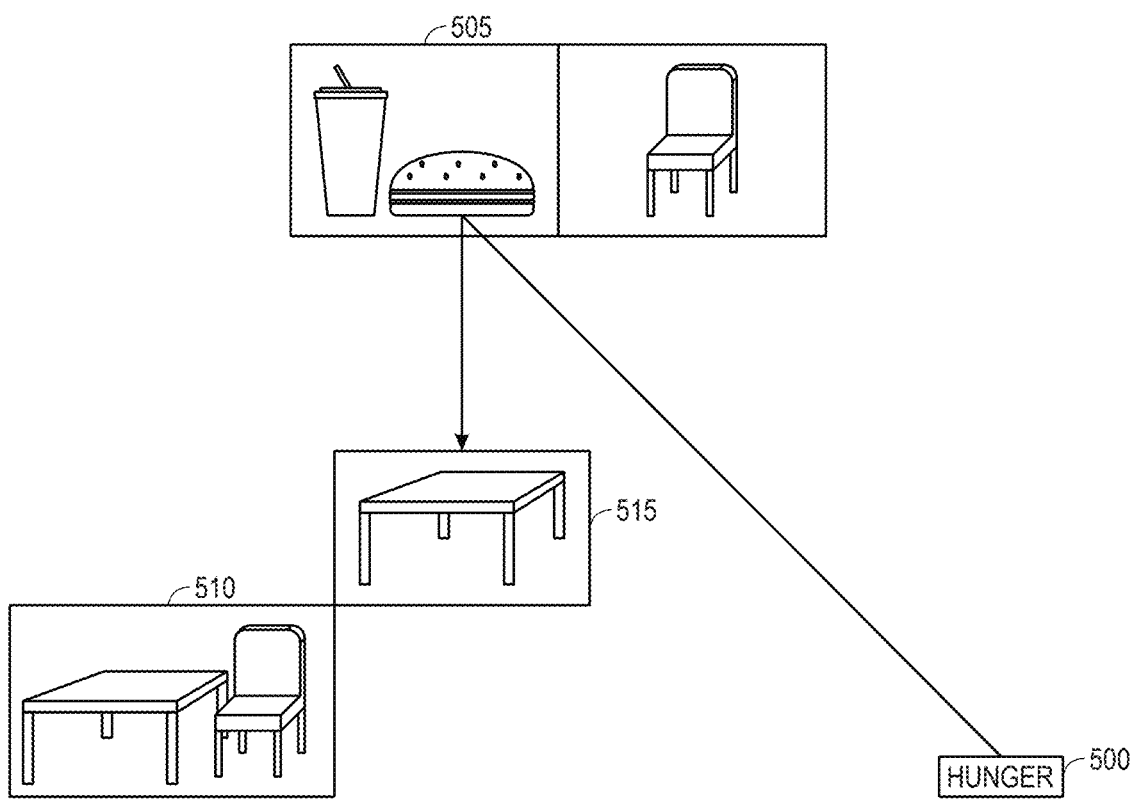
FIG. 6 shows a further example of the chain of concepts from FIG. 5, in accordance with aspects of the present disclosure.

FIG. 6 shows an example of the chain of concepts described in FIG. 5. The autoencoder is attempting to establish the concept of "hunger" 500. Based on the initial concept of "hunger" 500, multiple concepts with associated analogies are determined by the autoencoder. The first concept 505 associated with "hunger" 500 is that of food. The concept of food may have a previous analogy established with a chair, as the autoencoder may have previously determined that a chair is required to eat food. Thus, the analogy between chair and food has been established to determine the concept of food. Next, a second concept 510 between chair and table is determined by the autoencoder, as the chair has an analogy between food as well as the table. The analogy between the chair and table may be that a chair is used to sit at a table. Thus, this analogy helps establish the concept of the table and the relationship between table and food. Using these established analogies, the autoencoder determines that the concept of table 515 is used to support the concept of food 505, which in turn supports the concept of "hunger" 500.

Exemplary embodiments of methods, systems, and apparatus for use in the analogy generating system are not limited to the specific embodiments described herein, but rather, components of systems and/or steps of the methods may be utilized independently and separately from other components and/or steps described herein. For example, the methods, systems, and apparatus may also be used in combination with other systems, and are not limited to practice with only the systems and methods as described herein. Rather, the exemplary embodiment can be implemented and utilized in connection with many other applications, equipment, and systems that may benefit from generating analogies between different symbolic classes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An analogy generating system, comprising:
   one or more image databases comprising a first set of images depicting a first symbolic class and a second set of images depicting a second symbolic class; and
   an autoencoder configured to:
      receive images from the first set of images and the second set of images;
      determine a first characteristic of the first symbolic class using a neural network;
      determine the first characteristic of the second symbolic class using the neural network;
      determine an analogy between the first symbolic class and the second symbolic class using the first characteristic;
      determine a first concept about the first symbolic class using the analogy;
      determine a second concept about the second symbolic class using the analogy;
      establish a second analogy between the first concept and a third symbolic class;
      establish a third analogy between the second concept and the third symbolic class; and
      determine a third concept about the third symbolic class using the second analogy and the third analogy.

2. The analogy generating system of claim 1, wherein the analogy is a mapping between the first characteristic that defines how the first symbolic class and the second symbolic class are similar.

3. The analogy generating system of claim 1, wherein the autoencoder comprises:
   an input layer that receives the images;
   an output layer;
   a middle layer comprising a plurality of nodes, wherein the middle layer produces the analogy, and wherein the middle layer is compressed to be smaller than the input layer and the output layer.

4. The analogy generating system of claim 1, wherein an incomplete image missing a shared characteristic between the first symbolic class and the second symbolic class is one of the images received by the autoencoder.

5. The analogy generating system of claim 4, wherein the autoencoder adds the shared characteristic to the incomplete image based on the analogy between the first symbolic class and the second symbolic class.

6. The analogy generating system of claim 1, wherein the first concept is a salient feature of the first symbolic class.

7. The analogy generating system of claim 1, wherein the first set of images of the first symbolic class depicts a first action, a first face or facial feature, a first object, or a combination thereof.

8. The analogy generating system of claim 1, wherein the second set of images of the second symbolic class depicts a second action, a second face or facial feature, a second object, or a combination thereof.

9. A method, comprising:
   receiving, via a processor, a first set of images from a first image data base and a second set of images from a second image data base, wherein the first set of images depicts a first symbolic class and the second set of images depicts a second symbolic class;
   determining, via the processor, a first characteristic shared between the first symbolic class and the second symbolic class using a first node and a second node from a plurality of nodes on a neural network;
   exchanging, via the processor, the first characteristic between the first node and the second node to establish an analogy between the first symbolic class and the second symbolic class;
   determining, via the processor, a first concept about the first symbolic class and a second concept about the second symbolic class using the analogy;
   establishing, via the processor, a second analogy between the first concept and a third symbolic class;
   establishing, via the processor, a third analogy between the second concept and the third symbolic class; and
   determining, via the processor, a third concept about the third symbolic class using the second analogy and the third analogy.

10. The method of claim 9, wherein the analogy is a mapping between the first characteristic that defines how the first symbolic class and the second symbolic class are similar.

11. The method of claim 9, comprising receiving an incomplete image missing a shared characteristic between the first symbolic class and the second symbolic class, wherein the incomplete image is one of an image from the first and second set of images.

12. The method of claim 11, comprising adding the shared characteristic to the incomplete image based on the analogy between the first symbolic class and the second symbolic class.

13. The method of claim 11, wherein the first concept is a salient feature of the first symbolic class.

14. A non-transitory computer readable medium storing instructions that, when executed by a processor, cause the processor to:
- receive a first set of images and a second set of images, wherein the first set of images depicts a first symbolic class and the second set of images depicts a second symbolic class;
- determine a first characteristic shared between the first symbolic class and the second symbolic class using a neural network;
- establish an analogy between the first symbolic class and the second symbolic class using the first characteristic;
- determine a first concept about the first symbolic class and a second concept about the second symbolic class using the analogy;
- establish a second analogy between the first concept and a third symbolic class and establish a third analogy between the second concept and the third symbolic class; and
- determine a third concept about the third symbolic class using the second analogy and the third analogy.

15. The non-transitory computer readable medium of claim 14, wherein the analogy is a mapping between the first characteristic that defines how the first symbolic class and the second symbolic class are similar.

16. The non-transitory computer readable medium of claim 14, wherein the instructions, when executed by the processor, cause the processor to:
- receive an incomplete image missing a shared characteristic between the first symbolic class and the second symbolic class, wherein the incomplete image is one of an image from the first and second set of images; and
- add the shared characteristic to the incomplete image based on the analogy between the first symbolic class and the second symbolic class.

* * * * *